T. F. STOBER.
DRAG AND GRADER.
APPLICATION FILED AUG. 1, 1912.
1,063,474.
Patented June 3, 1913.
5 SHEETS—SHEET 1.
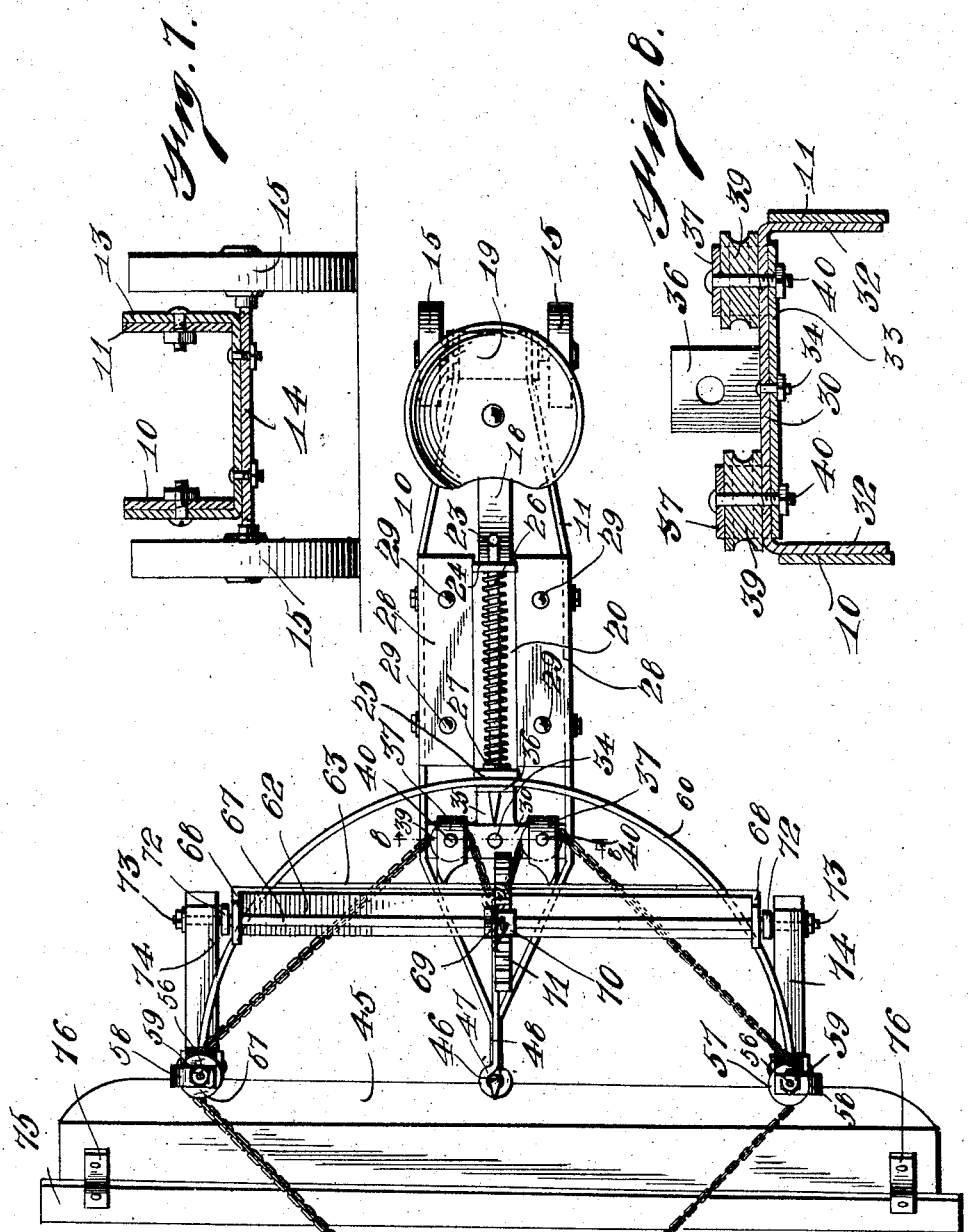

T. F. STOBER.
DRAG AND GRADER.
APPLICATION FILED AUG. 1, 1912.

1,063,474.

Patented June 3, 1913.
5 SHEETS—SHEET 2.

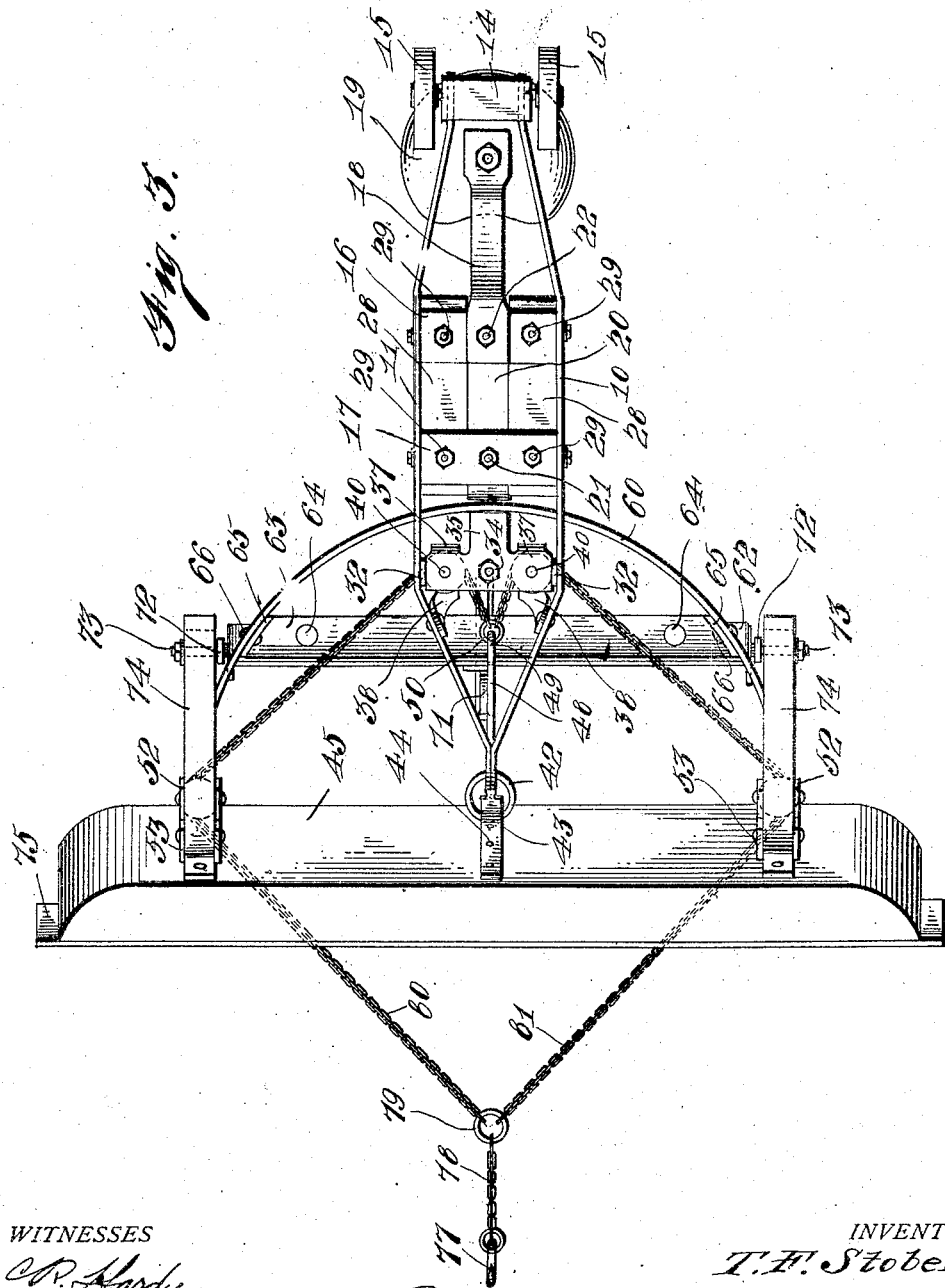

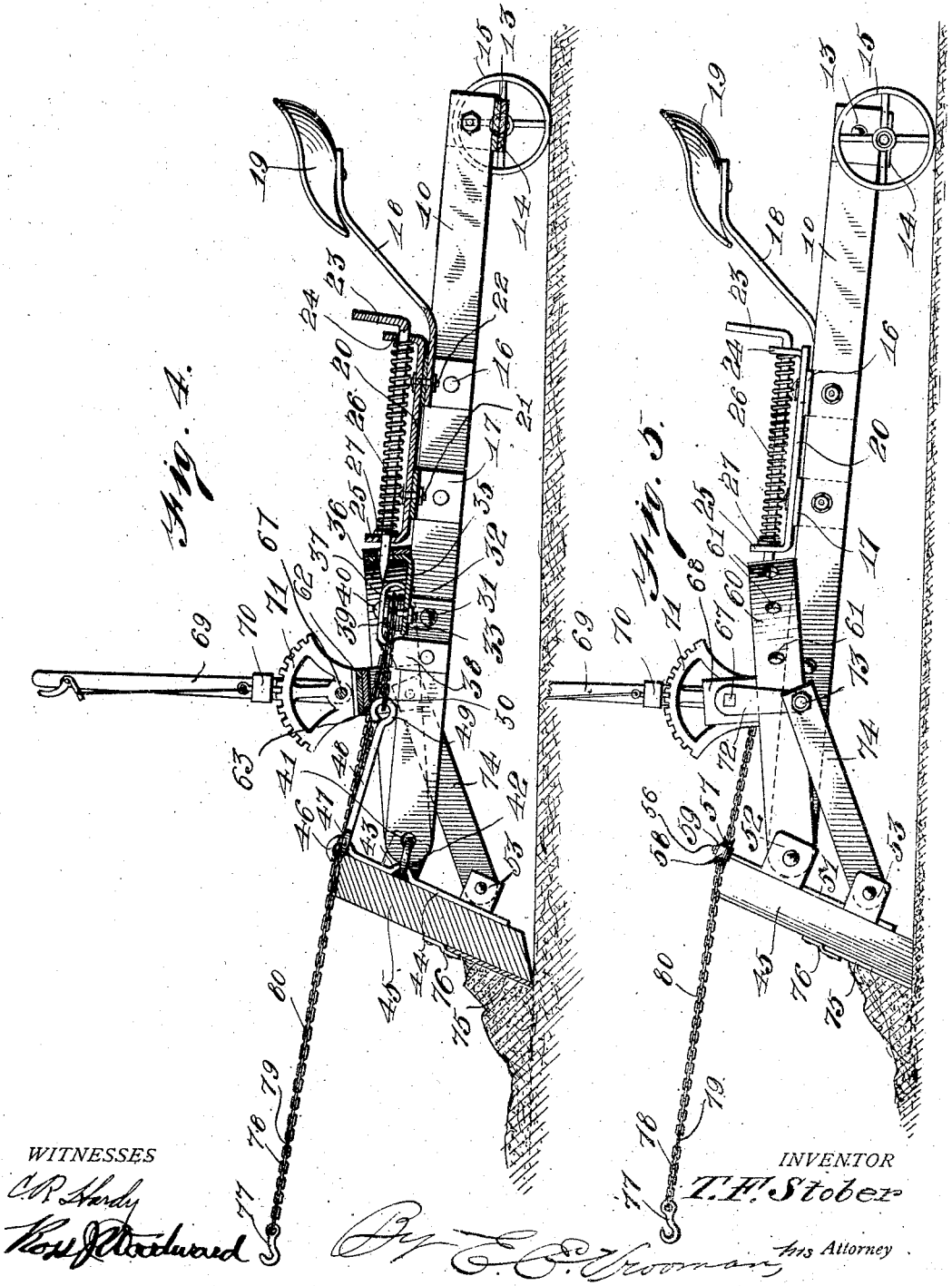

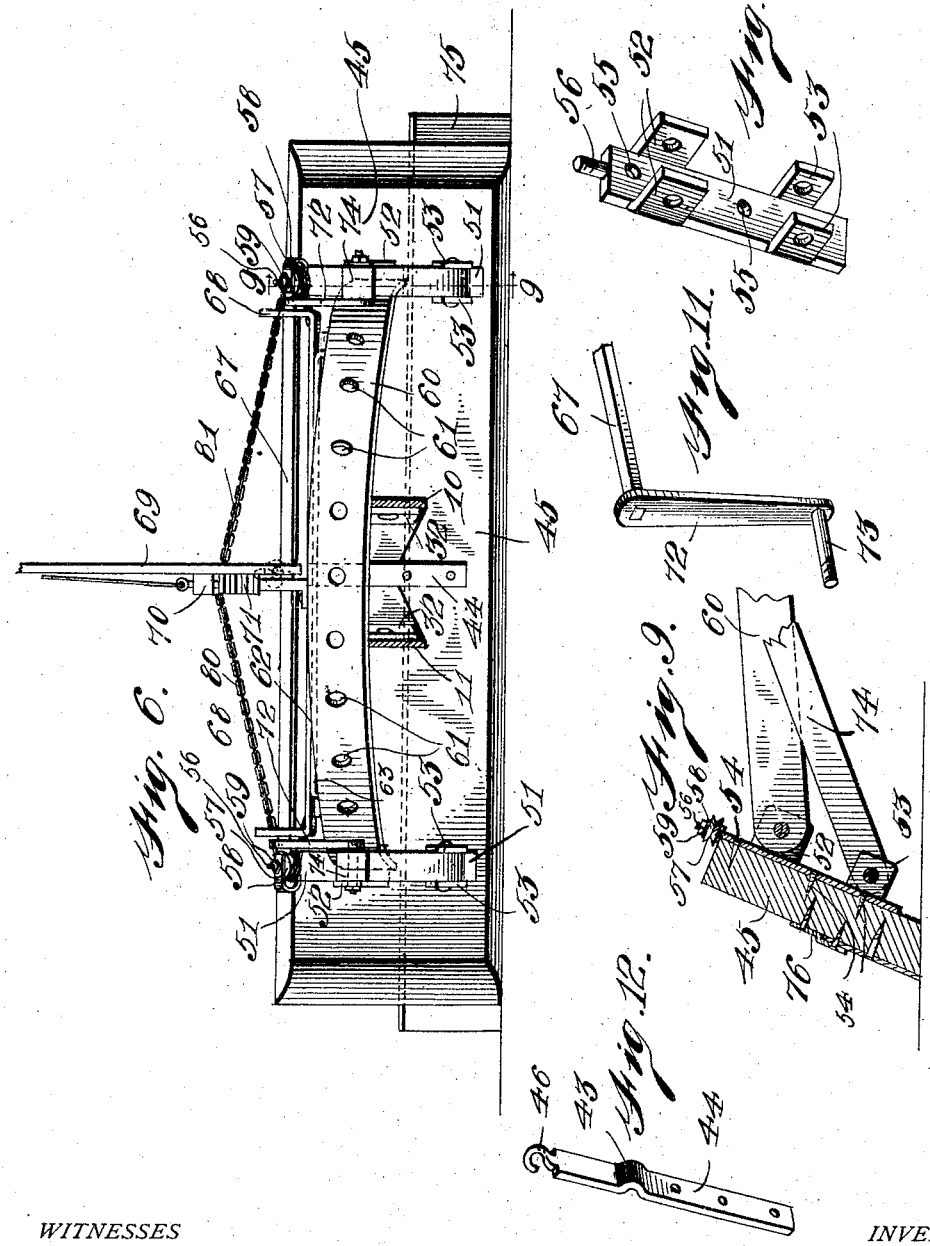

UNITED STATES PATENT OFFICE.

TOLA FRED STOBER, OF WEST GROVE, IOWA.

DRAG AND GRADER.

1,063,474.  Specification of Letters Patent.  Patented June 3, 1913.

Application filed August 1, 1912. Serial No. 712,812.

*To all whom it may concern:*

Be it known that I, TOLA F. STOBER, a citizen of the United States, residing at West Grove, in the county of Davis and State of Iowa, have invented certain new and useful Improvements in Drags and Graders, of which the following is a specification, reference being had therein to the accompanying drawing.

This invention relates to a scraping machine which is intended to be used when grading roads.

The principal object of the invention is to provide a scraper of the character described in which the scraping blade may be adjusted at any angle desired thereby permitting the material scraped from the road to be carried in front of the scraper or caused to move sidewise across the blade and to one side of the road. In this position the device could be used very efficiently as a snow plow since the snow would be pushed to one side of the road and deposited in the gutter where it could remain or could be very easily collected and carted away.

Another object of the invention is to provide a device for connecting the draft animals with the grader so that the animals will at all times be in alinement with the body portion of the grader and with the center of the scraping blade.

Another object of the invention is to so mount the scraping blade that it may be rocked upon horizontal pivots thereby permitting the blade to ride over any stationary obstructions in the road.

Another object of the invention is to provide a device for holding the blade in an adjusted position to prevent it from rocking upon its horizontal pivot pins.

Another object of the invention is to improve the general construction of the frame of this grader so that the frame will be very strong and durable, as few parts as possible being provided in order to form a strong and durable frame work.

Another object of the invention is to so connect the draft animal connection with the frame and cutting blade that the upper portion of the blade will be braced thereby removing a considerable part of the strain from the horizontal pivot pins of the blade.

In the accompanying drawings:—Figure 1 is a top plan view of the grader. Fig. 2 is a view similar to Fig. 1 with the blade turned to one side and shows the manner in which the draft animal connection accommodates itself to the incline of the blade. Fig. 3 is a bottom plan view with the blade in the position shown in Fig. 1. Fig. 4 is a longitudinal sectional view through the grader. Fig. 5 is a side elevation of the grader. Fig. 6 is a transverse sectional view through the grader. Fig. 7 is a sectional view along the line 7—7, of Fig. 2. Fig. 8 is a sectional view along the line 8—8, of Fig. 1. Fig. 9 is a sectional view along the line 9—9, of Fig. 6. Fig. 10 is a perspective view of one of the brackets which connect the blade with its supporting and adjusting means. Fig. 11 is a perspective view of one end portion of the shaft which adjusts the vertical angle of the blade. Fig. 12 is a perspective view of the device which pivotally connects the central portion of the blade with the frame and with which the bar carried by the draft attaching chain is pivotally connected.

Referring to the accompanying drawings it will be seen that this invention comprises a frame having the side bars 10 and 11, the rear end portions of which are connected by a U-shaped yoke 13 carrying the axle 14 upon which the supporting wheels for the rear portion of the frame are mounted. The U-shaped braces 16 and 17 are centrally located between the bars 10 and 11, and the spring arm 18, which supports the seat 19 is secured to the brace 16. A bracket 20 is secured to the braces 16 and 17 by means of the bolts 21 and 22, the bolt 22 also holding the seat supporting arm 18 in place. A pin 23 passes through openings formed in the upturned ends 24 and 25 of the bracket 20 and is normally held in the position shown in Fig. 4, by means of a coil spring 26 positioned between the upturned ends 24 and 25 of the bracket and bearing against a collar 27 mounted upon the pin 23. This pin holds the blade of the scraper at an adjusted angle as will be hereinafter brought out in the description. Platforms 28 are mounted upon the braces 16 and 17 to each side of the bracket 20 so that the driver of the scraper may step from the seat 19 along the frame to the forward portion of the frame and are held in place by means of the bolts 29.

A second U-shaped yoke 30 is secured between the arms 10 and 11 adjacent the forward end of the frame by means of the bolts 31 passing through the end portions 32 of the yoke 30 as shown in Figs. 4 and 8.

A plate 33 is secured to the under face of the yoke 30 by means of the bolt 34 and carries a neck 35 which extends rearwardly and has its end portion 36 bent upwardly and provided with a perforation formed in alinement with the opening formed in the end portion 25 of the bracket 20 so that the end of the pin 23 may pass through the alined openings. Arms extend from the end portions of the plate 33 and are carried over the yoke 30 to form the housings 37, the ends 38 of the arms being carried down in front of the yoke and secured to the side bars 10 and 11. Pulley wheels 39 are pivotally mounted in the housings 37 upon the pivot pins 40, and the draft chains, which will be hereinafter described, are passed through these housings and around the pulley wheels. The forward end portions of the side bars 10 and 11 are brought together and secured by any suitable means, and provided with an opening 41 through which a ring 42 passes as shown in Fig. 4. This ring 42 is positioned in a pocket 43 formed intermediate the length of the bar 44 so that the frame will be pivotally connected with the scraping blade 45. This bar 44 is secured vertically at the center of the blade 45 and has its upper end portion reduced and formed into a hook 46, passing through an eye 47 at one end of a bar 48. The opposite end of the bar is formed into a second eye 49 carrying the ring 50.

A bracket similar to that shown in Fig. 10 is mounted adjacent each end of the scraping blade 45 and comprises the body portion 51 carrying the upper pivot ears 52 and the lower pivot ears 53. These brackets are secured to the scraping blade by means of screws 54 passing through openings 55 in the body portion 51 and are provided at their upper ends with reduced stems 56 upon which pulley wheels 57 are mounted. A U-shape guard 58 is positioned about each of the wheels 57 and the wheels and guards are held in place by the securing nuts 59. These guards hold the draft chains upon the pulley wheels 57 so that there is no danger of the draft chains slipping off.

A curved bar 60 which is provided with the perforations 61 has its end portions pivotally mounted between the pivot ears 52 by means of the pivot pins 62 and passes between the end portions 25 and 36 of the bracket 20 and neck 35. It will thus readily be seen that since the scraping blade is pivotally connected with the frame by means of the ring 42 that when the blade is turned upon this pivot point that the bar 60 will travel between the upturned end portions 25 and 36 thereby bringing the openings 61 in alinement with the openings formed in these upturned end portions and permitting the pin 23 to pass through the openings thus holding the cutting blade in an adjusted position. In this manner the blade may be swung from the position shown in Fig. 1 to one side shown in Fig. 2 or it may be if desired swung to the opposite side from that shown in Fig. 2. The spring 26 which bears against the collar 27 holds the pin firmly in place thereby preventing any danger of the blade moving from the adjusted position.

A bracket 62 is secured upon a brace 63 by means of the bolts 64, the brace 63 having its end portions 65 secured to the curved bar 60 by means of the rivets 66 and securely holds the bar in the curved shape so that it will travel freely when adjusting the scraping blade. A shaft 67 is pivotally mounted in openings formed in the ends 68 of the bracket 62 and carries an operating lever 69 by means of which the shaft 67 may be rotated. This lever 69 is provided with the latch 70 adapted to engage the teeth of a rack 71 carried by the bracket 62 in order that the lever and shaft may be held in an adjusted position. An arm 72 is mounted upon each end of the shaft 67 and is reduced at its free end so that a link 74 may be pivotally connected with the arm 72. The outer end of the links 74 are pivotally mounted between the pivot ears 53 and it will readily be seen that when the lever is moved from the position shown in Figs. 4 and 5 that the angle of the scraping blade 45 will be vertically adjusted. A plate 75 which is of greater length than the blade 45 is secured to the lower edge of the blade by means of the brackets 76 in order to protect the blade from wear. As soon as the plate 75 is worn out a new one can be very readily obtained and connected with the brackets 76 to replace the worn out blade.

The draft animals have their whiffle trees connected with the hook 77 at the outer end of the chain 78. This chain 78 has its inner end connected with a ring 79 with which chains 80 and 81 are also connected. The chains 80 and 81 are carried around the pulley wheels 57 with their end portions carried inwardly and around the pulley wheels 39 mounted in the housings 37 and connected with the ring 50 at the inner end of the bar 48. From a comparison of Figs. 1 and 2 it will readily be evident that when the scraping blade is swung to one side that the chains accommodate themselves to the angle of the blade and thereby at all times keeping the draft animals in alinement with the frame and the center of the scraping blade.

When using this device the draft animals are connected with the hook 77 and the scraper is then ready for use. The scraping blade may be left as shown in Figs. 1 and 3 in which case the snow or dirt would be carried in front of the machine or the blade may be inclined as shown in Fig. 2 in which position the dirt would slide longitudinally along the blade to the side of the road. It should be noted that the principal strain would come at the lower portion of the blade and therefore, it is desired to brace the upper portion of the blade to prevent this strain from causing the links 74 to break. In order to do this the chains 80 and 81 have been connected with the bar 48, thereby creating a brace for the upper portion of the scraping blade and preventing the strain when in use from breaking the link 74 or pivot pins for these links.

Having thus described the invention what is claimed as new, is:—

1. In a machine of the character described, an operating element, and flexible means for connecting a draft means with said machine and for bracing said operating element.

2. A machine of the character described comprising a frame, a scraping blade pivotally connected with said frame, and common means for connecting a draft means with said machine and for bracing said blade against pivotal movement.

3. A machine of the character described comprising a frame, a scraping blade pivotally connected with said frame, and flexible means for connecting a draft means with said machine and for bracing said blade against pivotal movement.

4. A machine of the character described comprising a frame, a scraping blade pivotally connected with said frame, cables connected with said blade and frame, a bar pivotally connected with the central portion of said blade and with the inner ends of said cables, and attaching means connected with the outer ends of said cables.

5. A machine of the character described comprising a frame, a scraping blade pivotally connected with said frame, pulley wheels carried at the forward end of said frame and at the ends of said blade, cables connected at their outer ends and passing around the pulleys of said blade to and around the pulley of said frame, a bar secured to said blade and connected with the inner ends of said cables, and attaching means connected with the outer ends of said cables.

6. A machine of the character described comprising a frame, a scraping blade pivotally connected with the forward end of said frame, means for horizontally adjusting said scraping blade and holding the same in an adjusted position, means for vertically adjusting the angle of said scraping blade and holding the same in an adjusted position, a draft chain passing around pulleys carried by said frame and scraping blade, and a bar having one end pivotally connected with said chain and the opposite end pivotally connected with said scraping blade.

7. A machine of the character described comprising a frame, a scraping blade pivotally connected with the forward end of said frame, a curved adjusting bar having its end portions pivotally connected with the end portions of said blade and resting upon said frame, means carried by said frame for engaging said bar to hold said blade at an adjusted angle, a bracket carried by said bar, a shaft carried by said bracket, links pivotally connected with the end portions of said shaft and having their forward ends pivotally connected with said blade, means for rotating said shaft for adjusting the vertical angle of said blade, and means for connecting a draft means with said machine and bracing said blade against vertical pivotal movement.

8. A machine of the character described comprising a frame, said frame having side bars, braces positioned intermediate the length of said side bars, a bracket carried by certain of said braces, a spring controlled pin carried by said bracket, a plate carried by the forward one of said braces and provided with a neck terminating in an upstanding end positioned in alinement with the end of said bracket, a scraping blade pivotally connected with said frame, a curved bar pivotally connected with said blade and passing through the space between the end of said bracket and the upturned end of said neck whereby said pin may pass through openings formed in said bar to hold the blade in an adjusted position, pulley wheels mounted upon said blade and plate, a draft chain passing around said pulley wheels, a bar pivotally connected with the central portion of said blade and with the inner ends of said chain, and with attaching means connected with the outer end portion of said chain.

9. In a machine of the character described, a frame, comprising side bars having their farward ends brought together, an axle connected with the rear end portions of said side bars, transverse braces positioned intermediate the length of said side bars, a bracket carried by certain of said braces, a spring controlled pin slidably mounted in said bracket, a plate mounted upon the forward one of said braces, a neck extending from said plate and having its end portion bent upwardly into alinement with the end portion of said bracket, arms extending from said plate and bent to form pulley housings, pulley wheels mounted in said housings, a scraping blade pivotally connected with the forward end portions of said side bars, brackets carried by said blade, pulley wheels carried by said brackets, a curved bar having its end portions pivotally connected with said brackets carried by said blade and passing between the upturned end portion of said neck and the end of said first mentioned bracket whereby said pin may pass through openings formed in said bar to hold said blade in an adjusted position, a bar pivotally connected with said blade, draft chains pivotally connected with the inner end of said bar and passed around the pulley wheels of said frame to and around the pulley wheels of said blade, and connecting means connecting the outer ends of said chains.

10. A machine of the character described comprising a frame, a scraping blade, a vertically extending bar centrally located upon said blade and having its upper end formed into a hook, a link pivotally connected with said bar and pivotally connecting said blade with the forward end portion of said frame, pulley wheels connected with said blade, pulley wheels connected with said frame, a bar pivotally connected with said hook, cables pivotally connected with the inner end of said bar and passing around the pulleys of said frame to and around the pulley of said blade, a cable connected with the outer end portions of said first mentioned cables, and an attaching hook carried at the outer end portion of said last mentioned cable.

11. A machine of the character described comprising a frame, a scraping blade pivotally connected with said frame, a curved bar carried by said blade, means for engaging said curved bar to regulate the horizontal angle of said blade, a bracket connected with said curved bar, a shaft rotatably mounted in said bracket, arms rigidly secured to the end portions of said shaft, links pivotally connecting said arms with said blade beneath the pivot point of said curved bar, a latch lever carried by said shaft for rotating the same to vertically adjust the angle of said blade, and means for connecting a draft means with said frame and for bracing said blade against vertical pivotal movement.

12. A machine of the character described comprising a frame, a scraping blade pivotally connected with said frame, vertically extending brackets mounted adjacent the end portions of said blade, upper and lower pivot ears carried by said brackets, pulley wheels connected with the upper end of said bracket, a curved bar having its end portions pivotally mounted between said upper pivot ears and extending across said frame, means carried by said frame for engaging said curved bar to hold said blade at an adjusted angle, a bar pivotally connected with said blade, pulley wheels carried by said frame, and draft attaching means passing around said pulley wheels and pivotally connected with the inner end of said bar.

In testimony whereof I hereunto affix my signature in presence of two witnesses.

TOLA FRED STOBER.

Witnesses:
J. S. GREGORY,
W. F. STOBER.

---

Copies of this patent may be obtained for five cents each, by addressing the "Commissioner of Patents. Washington, D. C."